United States Patent [19]

Fournier

[11] 4,106,162
[45] Aug. 15, 1978

[54] MOLD FOR FORMING A HAMBURGER PATTY

[76] Inventor: Herve L. Fournier, 95 Curtis Ave., South Attleboro, Mass. 02703

[21] Appl. No.: 810,911

[22] Filed: Jun. 29, 1977

[51] Int. Cl.² .............................................. A22C 7/00
[52] U.S. Cl. ..................................... 17/32; 425/298; 425/299; 426/282; 426/513; 426/514
[58] Field of Search ............... 426/104, 646, 513, 514, 426/518, 282; 17/32; 425/298, 299, 288, 410, 412, 414, 423

[56] References Cited

U.S. PATENT DOCUMENTS

| | | | |
|---|---|---|---|
| 176,217 | 4/1876 | Collins | 425/298 |
| 1,297,900 | 3/1919 | Patton | 425/299 |
| 2,191,921 | 2/1940 | Ziringer | 17/32 |
| 2,625,876 | 1/1953 | Hammerberg | 17/32 |
| 2,670,296 | 2/1954 | Tansley | 426/513 |
| 2,937,095 | 5/1960 | Zitin | 426/646 |
| 3,120,678 | 2/1964 | Glenny | 17/32 |
| 3,863,020 | 1/1975 | Robinson | 426/646 |
| 3,909,881 | 10/1975 | Anderson | 426/513 |

Primary Examiner—S. Leon Bashore
Assistant Examiner—Steve Alvo
Attorney, Agent, or Firm—Max Schwartz

[57] ABSTRACT

A mold for forming a hamburger patty comprising upper and lower mold members. The lower mold comprises a flat disc portion of a suitable material such as stainless steel, etc. At the center of the disc, a wooden dowel or post extends upwardly, the dowel or post being annular or any other desired configuration. A half round rib extends annularly around the central dowel or post and spaced therefrom. The top of the mold is annular with a depending wall portion which defines the perimeter of the patty. The upper member has a central hollow post of the same shape as the lower dowel or post but with an internal diameter equal to the outer diameter of the lower post. This permits the upper post to slide over the lower post. The upper member is also provided with a complementary half round rib spaced from the central post and adapted to seat over the lower rib when the mold parts are positioned together. A glob or portion of ground meat is placed on the bottom portion of the mold surrounding the central post. The top member is now pressed down so that the hollow post slides over the lower post. The depending edge of the upper mold will cut the meat and confine a correct portion to form the patty in the mold. The posts will form a central opening and the half round members will form a groove in the patty, which now forms a donut shape.

2 Claims, 5 Drawing Figures

MOLD FOR FORMING A HAMBURGER PATTY

The present application constitutes a refilling of my abandoned application Ser. No. 683,470, filed 5/5/76.

BACKGROUND OF THE INVENTION

Hamburger patties are now prepared and packaged in exact shapes and weights of meat so that the hamburgers are all uniform. However, when the finished hamburger is placed in a roll or bun, the condiment added, mustard and ketchup, and the chopped onions, will drip and leak from the edges of the hamburger. No means are provided for retaining the condiments and other additives within the confines of the bun.

SUMMARY OF THE INVENTION

The present invention is designed to provide a method and means for forming a hamburger patty which will hold the various condiments and other additives in the hamburger without leakage. Furthermore, the mold of the present invention is simple and easy to use and can is readily usable at home to make the hamburgers easier to make and more palatable. The mold is designed to provide the hamburger patty with a comparatively large central opening of any desired configuration and an indented groove around the center. The opening and groove can be used to contain and hold the condiments or any other additives in the bun.

DESCRIPTION OF THE INVENTION

Figure 3:
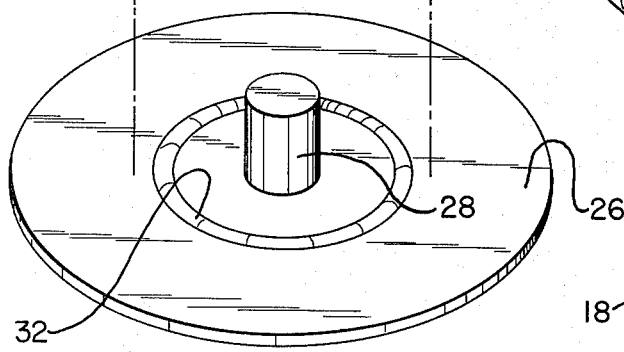
FIG. 3 is a perspective view of a hamburger patty formed by the method and mold of the present invention.

Referring more in detail to the drawings, the patty formed by the present invention is more particularly shown in FIG. 3. It comprises an annular disc 10 of ground meat having a predermined thickness and weight. The disc 10 is provided with a central opening 12 extending therethrough and illustrated as being annular in section. In the form shown, the diameter of the opening is between ¼ and ⅓ of the diameter of the patty. Approximately midway between the perimeter of the opening 12 and the edge of the hamburger patty 10, the patty is provided with an annular groove 14 on both sides of the patty. This presents a groove at the top no matter how the patty is turned.

Figure 4:
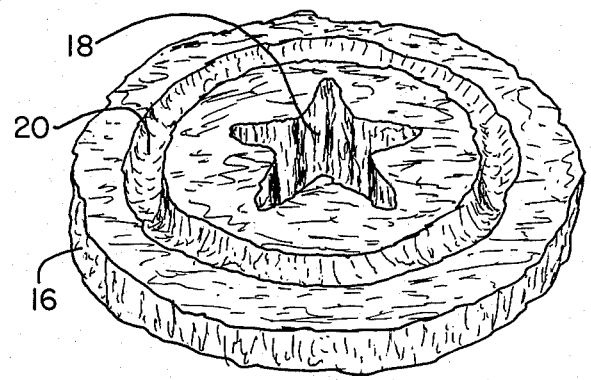
FIG. 4 is a perspective view of another form of patty formed by the method and mold of the present invention.

The central opening 12 is illustrated in FIG. 3 as annular. However, any desired convenient shape can be used. For example, as shown in FIG. 4, the patty 16 is provided with a central opening 18 which is star shaped. This form also has the grooves 20.

When the patties 10 or 16 have been cooked and placed in a hamburger roll, the central openings 12 or 18 and the grooves 14 or 20, are used for holding the additives and condiments. For example, chopped onions may be placed to fill in the central opening and ketchup or mustard in the grooves. Or relish or mushrooms can be placed in the center. The opening and grooves will effectively prevent leakage of the additives around the edges of the hamburger when it is being eaten.

Figure 5:
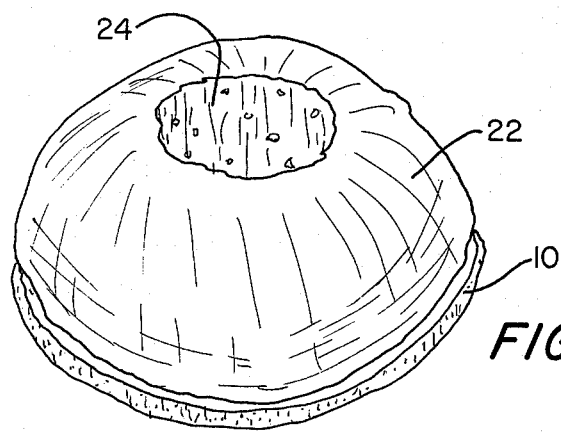
FIG. 5 is a perspective view of a hamburger on a bun modified to handle a patty of the present invention.

For additional effect, the hamburger bun or roll can be made as shown in FIG. 5. Here the patty 10 is shown in a roll or bun 22 in which the top of the roll has a central opening 24 aligned with the central opening 12 of the patty. This allows a condiment, or onions, or relish to be piled into the hamburger after the sandwich has been made.

Figure 1:
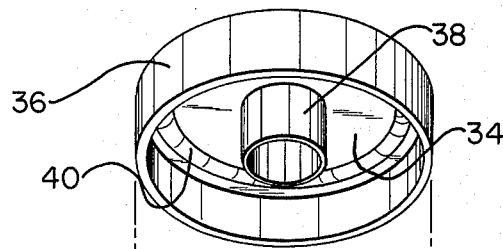
FIG. 1 is an exploded perspective view of the mold for forming the patty of the present invention.
Figure 2:
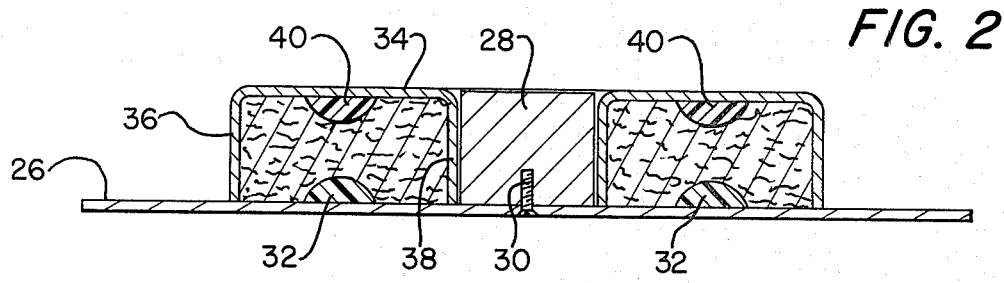
FIG. 2 is a transverse section through the mold with the ground meat in place for forming the patty.

The method and means for forming the patty is more particularly illustrated in FIGS. 1 and 2. An enlarged, annular lower plate 26 is made of a suitable material such as stainless steel. The plate 26 is provided with a central post or dowel 28 which can be made of wood or plastic and mounted by a screw 30, FIG. 2. Spaced from the post 28, a half-round rib 32 is mounted on the plate 26 and extends in a circle around the post.

The upper portion of the mold is built like a cooky cutter for apportioning the correct amount of ground meat in the mold. It comprises an annular top 34 having a depending skirt 36 around the perimeter. The height of the portion 36 is such that it will form the correct thickness of patty. Depending from the center of the top 34 is a hollow post 38 of approximately the same height as the post 28, but with an inside diameter equal to the outside diameter of the post 28 so that the post 38 will slide over the post 28, FIG. 2. Spaced from the post 38 is a complementary annular half-round rib portion 40 vertically aligned with the rib 32 on the lower portion 26.

The method of forming the patty 10 is simple. A quantity of ground hamburger meat is positioned on the lower portion 26 surrounding the post 28. The upper member is now pressed down over the meat with the post 38 sliding over the post 28. Just like a cooky cutter, the depending skirt portion 36 will cut into the meat and confine the correct amount within the mold as shown in FIG. 2. As can be seen in FIG. 2, the posts 28 and 38 will form an opening in the center of the patty, and the ribs 32 and 40 will form grooves 14 in the top and bottom of the patty 10, now shaped like a donut.

As illustrated in FIGS. 1 and 3, the patty is provided with an annular central opening 12 formed by the annular dowel 28 and annular post 38. However, to provide a pleasing effect, the dowel and post can be any other shape, for example starshaped for forming the opening 18 shown in FIG. 4. With the central opening, the hamburg patty forms the shape of a donut. The donut shape of a hamburg patty is novel, but it also has the advantage of permitting more thorough cooking of the meat and, of course, the holding of the additives and condiments as hereinabove described.

I have thus provided a simple and easy means for forming a hamburg patty in the shape of a donut having a central opening and grooved for retaining the usual additions to a hamburger such as onions, relish, mustard, ketchup, etc. The device is simple in construction and can be used commercially or at home. Other advantages of the present invention will be readily apparent to a person skilled in the art.

I claim:

1. A mold for forming a hamburger patty comprising a lower mold member in the form of an annular flat disc of larger diameter than the desired patty, and an upper mold member comprising an annular disc of the same size as the desired patty, said upper disc having a depending wall portion, and telescoping means at the center of said members for guiding said members and for forming a large central opening in the patty, said telescoping means comprising a hollow member extending from the center of the surface of one of said mold members, and having a diameter ¼ to ⅓ the diameter of the upper disc, and a complementary solid member extending from the center of the surface of the other of said mold members, said solid member having an outer diameter slightly smaller than the inner diameter of said hollow member, said solid member being slidable into said hollow member to guide said mold members toward each other and to provide the meat patty with a large central opening and a doughnut shape.

2. A mold as in claim 1, wherein said mold members are provided with ribs for forming annular grooves in the patty.

* * * * *